United States Patent
Yamazaki et al.

(10) Patent No.: US 7,139,472 B2
(45) Date of Patent: Nov. 21, 2006

(54) CAMERA SYSTEM

(75) Inventors: Hirofumi Yamazaki, Yokohama (JP); Masahiro Suzuki, Inzai (JP); Masami Takemoto, Shinjuku-ku (JP)

(73) Assignee: Nikon Corporation, Tokyo (JP)

( * ) Notice: Subject to any disclaimer, the term of this patent is extended or adjusted under 35 U.S.C. 154(b) by 139 days.

(21) Appl. No.: 10/896,978

(22) Filed: Jul. 23, 2004

(65) Prior Publication Data

US 2005/0031333 A1    Feb. 10, 2005

(30) Foreign Application Priority Data

Aug. 8, 2003   (JP) .............................. 2003-290129

(51) Int. Cl.
   *G03B 15/05*   (2006.01)
   *G03B 17/00*   (2006.01)

(52) U.S. Cl. ..................... 396/56; 396/157; 396/171; 396/182; 396/266

(58) Field of Classification Search ............ 396/56–59, 396/157, 171, 182, 263, 266
   See application file for complete search history.

(56) References Cited

U.S. PATENT DOCUMENTS 4,534,634 A * 8/1985 Tabata et al. .............. 396/266
6,404,987 B1 * 6/2002 Fukui ........................ 396/56
6,718,135 B1 * 4/2004 Kawasaki et al. .......... 396/182
6,987,931 B1 * 1/2006 Iwasaki ..................... 396/157

FOREIGN PATENT DOCUMENTS

JP    A-11-212148    8/1999

\* cited by examiner

*Primary Examiner*—W. B. Perkey
(74) *Attorney, Agent, or Firm*—Oliff & Berridge PLC

(57) ABSTRACT

A camera executes a photographing operation with multiple flashes. The camera includes a photometering unit and a control unit. The control unit controls light emission at a first electronic flash unit which is either built into or externally mounted at the camera and transmits a light signal constituting a preliminary light emission command to a second electronic flash unit provided separately from the camera by engaging the first electronic flash unit in light emission. The photometering unit photometers a subject when the second electronic flash unit executes a preliminary light emission. The control unit allows a photographing operation to be executed if a photometered value detected at the photometering unit is equal to or greater than a predetermined threshold value.

15 Claims, 6 Drawing Sheets

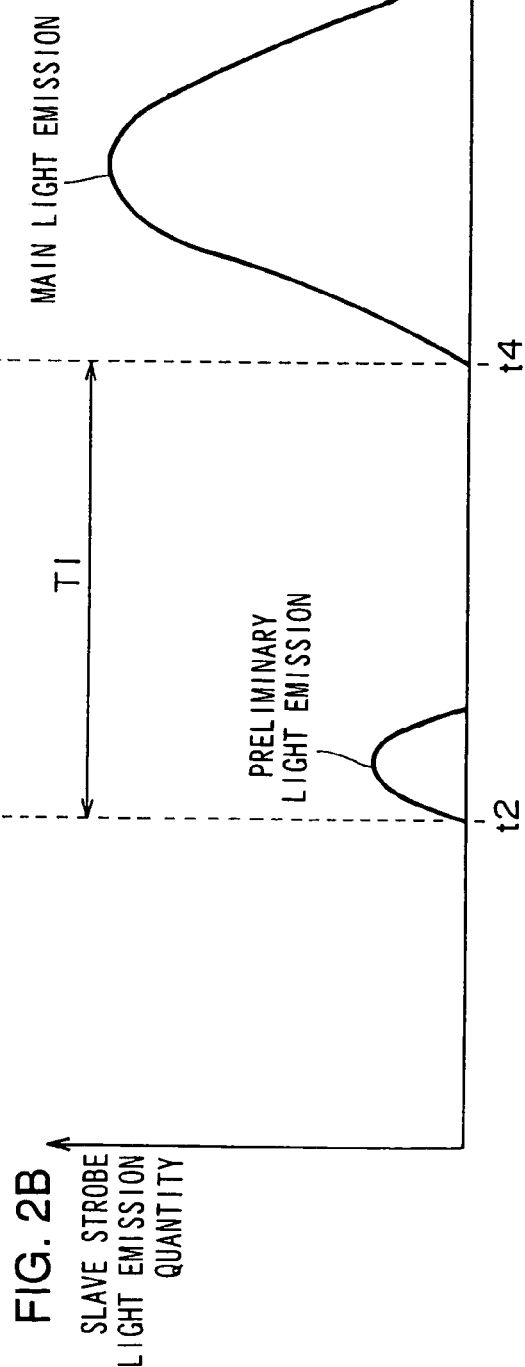

CAMERA SYSTEM

INCORPORATION BY REFERENCE

The disclosure of the following priority application is herein incorporated by reference: Japanese Patent Application No. 2003-290129 filed Aug. 8, 2003.

BACKGROUND OF THE INVENTION

1. Field of the Invention

The present invention relates to a camera system used to photograph a subject under flash light by utilizing a camera-side master strobe and a separately provided slave strobe.

2. Description of the Related Art

There are camera systems known in the related art in which a subject is photographed with multiple flashes by using an electronic flash unit (referred to as a "strobe" in this specification) mounted at the accessory shoe of the camera and a separate strobe for photographing with multiple flashes (for instance, see Japanese Laid Open Patent Publication No. H11-212148).

In such a camera system, the quantity of light emitted from the camera-side master strobe is monitored on a separately provided slave strobe side, a light emission at the slave strobe is started synchronously with the start of light emission at the master strobe and the light emission at the slave strobe is synchronously stopped as the light emission at the master strobe stops. In other words, the light emission at the slave strobe is controlled through optical communication between the master strobe and the slave strobe achieved via the flash light emitted from the master strobe.

SUMMARY OF THE INVENTION

However, there is a problem to be addressed in the camera system in the related art described above in that since the light emission at the slave strobe is controlled through optical communication between the master strobe and the slave strobe, a communication error occurs if the light from the master strobe is blocked by an object and, as a result, a regular photographing operation is executed only with the master strobe emitting light without engaging the slave strobe in light emission.

According to the 1st aspect, a camera system comprises: a camera having a photometering unit and a first light emission control unit; a first electronic flash unit having a first flash light emission unit, a light emission from which is controlled by the first light emission control unit, either built into or externally mounted at the camera; and a second electronic flash unit having a second flash light emission unit, a light receiving unit and a second light emission control unit, provided separately from the camera, and: the first light emission control unit transmits a light signal constituting a preliminary light emission command to the second electronic flash unit by causing the first flash light emission unit to emit light; the second light emission control unit engages the second flash light emission unit in a preliminary light emission upon receiving the light signal constituting the preliminary light emission command at the light receiving unit; and the first light emission control unit engages the photometering unit to photometer a subject when the second electronic flash unit executes the preliminary light emission, and if a photometered value thus obtained is equal to or greater than a predetermined threshold value, the first light emission control unit judges that optical communication between the camera and the second electronic flash unit is enabled and allows a photographing operation to be executed.

According to the 2nd aspect, in the camera system according to the 1st aspect, it is preferred that: if the photometered value detected when the preliminary light emission is executed is less than the predetermined threshold value, the first light emission control unit judges that the optical communication between the camera and the second electronic flash unit is disabled, disallows a photographing operation and issues a warning.

According to the 3rd aspect, in the camera system according to the 1st aspect, it is preferred that: the preliminary light emission command contains a coded light pulse train signal indicating a light emission quantity command value for a main light emission to be executed at the second electronic flash device.

According to the 4th aspect, in the camera system according to the 3rd aspect, it is preferred that: the camera includes a storage unit in which a table containing correct light emission quantities for the main light emission set in correspondence to varying photometered values detected when the preliminary light emission is executed is stored; and the first light emission control unit reads out a correct light emission quantity for the main light emission corresponding to the photometered value detected through the preliminary light emission from the table, adjusts the light emission quantity command value to a value equal to or greater than the correct light emission quantity if the light emission quantity command value is less than the correct light emission quantity, and transmits a coded light pulse train indicating the adjusted light emission quantity command value to the second electronic flash unit from the first flash light emission unit.

According to the 5th aspect, in the camera system according to the 4th aspect, it is preferred that the camera includes: a CCD that captures an image of a subject; and a gain adjustment unit that raises a gain to be applied to an image capturing signal output from the CCD in correspondence to the photometered value obtained through the preliminary light emission if a maximum light emission quantity that can be achieved at the second electronic flash unit is less than the correct light emission quantity.

According to the 6th aspect, in the camera system according to the 1st aspect, it is preferred that: the first flash light emission unit at the camera is not engaged in the main light emission and the main light emission is executed at the second flash light emission unit of the second electronic flash unit alone.

According to the 7th aspect, a camera that executes a photographing operation with multiple flashes, comprises: a photometering unit; and a control unit, and: the control unit controls light emission at a first electronic flash unit which is either built into or externally mounted at the camera and transmits a light signal constituting a preliminary light emission command to a second electronic flash unit provided separately from the camera by engaging the first electronic flash unit in light emission; the photometering unit photometers a subject when the second electronic flash unit executes a preliminary light emission; and the control unit allows a photographing operation to be executed if a photometered value detected at the photometering unit is equal to or greater than a predetermined threshold value.

According to the 8th aspect, in the camera according to the 7th aspect, it is preferred that: if the photometered value obtained through the preliminary light emission is smaller than the predetermined threshold value, the control unit disallows a photographing operation and issues a warning.

According to the 9th aspect, in the camera according to the 7th aspect, it is preferred that: the preliminary light emission command contains a coded light pulse train signal indicating a light emission quantity command value for a main light emission to be executed at the second electronic flash device.

According to the 10th aspect, in the camera according to the 9th aspect, it is preferred that: there is further provided a storage unit in which a table containing correct light emission quantities for the main light emission set in correspondence to varying photometered values detected when the preliminary light emission is executed is stored; and the control unit reads out a correct light emission quantity for the main light emission corresponding to the photometered value detected through the preliminary light emission from the table, adjusts the light emission quantity command value to a value equal to or greater than the correct light emission quantity if the light emission quantity command value is less than the correct light emission quantity and transmits a coded light pulse train indicating the adjusted light emission quantity command value to the second electronic flash unit from the first electronic flash unit.

According to the 11th aspect, in the camera system according to the 10th aspect, it is preferred that there is further provided: a CCD that captures an image of the subject; and a gain adjustment unit that raises a gain to be applied to an image capturing signal output from the CCD in correspondence to the photometered value obtained through the preliminary light emission if a maximum light emission quantity that can be achieved at the second electronic flash unit is less than the correct light emission quantity.

According to the 12th aspect, in the camera according to the 7th aspect, it is preferred that: the first electronic flash unit is not engaged in the main light emission and the main light emission is executed at the second electronic flash unit alone.

According to the 13th aspect, it is preferred that the camera according to the 7th aspect is a digital still camera.

According to the 14th aspect, in the camera system according to the 1st aspect, it is preferred that: the camera includes an image capturing device that captures an image of a subject; and the photographing operation is an image capturing operation executed at the image capturing device.

According to the 15th aspect, in the camera according to the 7th aspect, it is preferred that there is further provided an image capturing device that captures an image of a subject; and the photographing operation is an image capturing operation executed at the image capturing device.

BRIEF DESCRIPTION OF THE DRAWINGS

FIGS. 2A and 2B illustrate the photographing operation with multiple flashes executed in the embodiment;

DESCRIPTION OF THE PREFERRED EMBODIMENT

Figure 1:
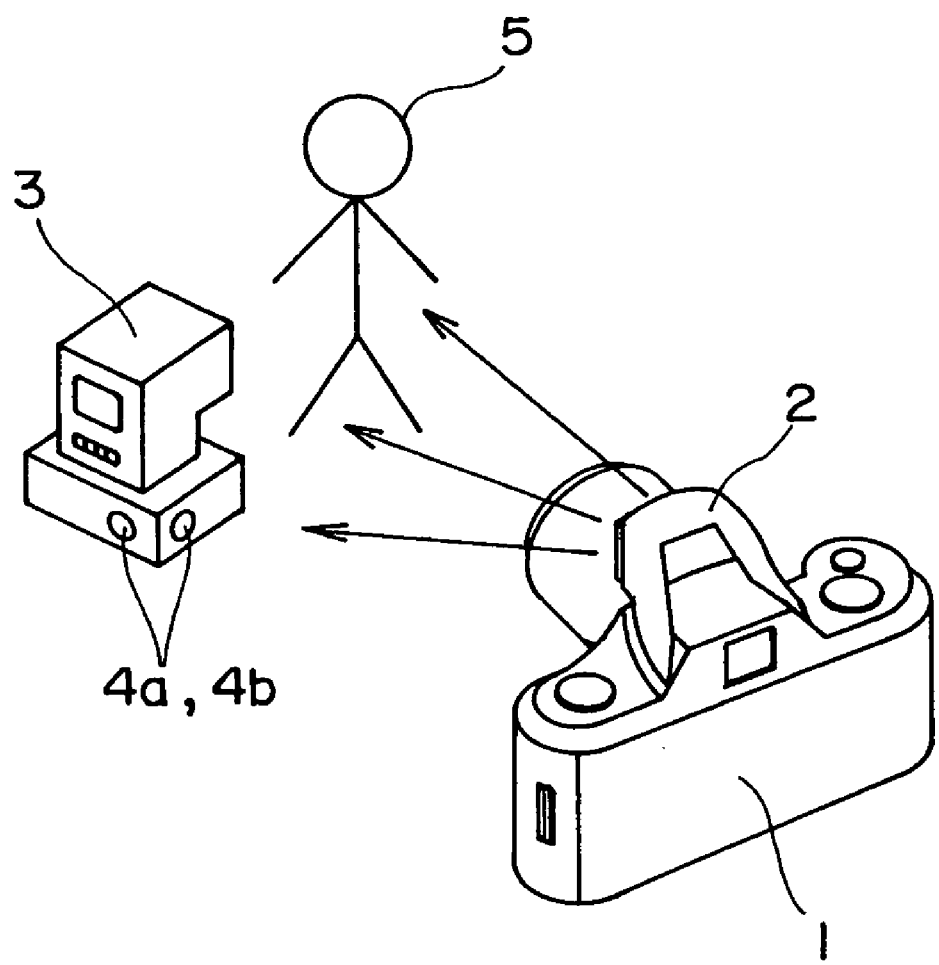
FIG. 1 schematically illustrates the camera system achieved in an embodiment.

FIG. 1 schematically illustrates an embodiment of the present invention. A digital still camera 1 includes a pop-up type internal strobe (hereafter referred to as a master strobe) 2. A separately provided strobe (hereafter referred to as a slave strobe) 3 used for photographing with multiple flashes receives flash light emitted from the master strobe 2 at its photodiode 4a or 4b. In the embodiment, a photographing operation with multiple flashes is executed by illuminating a subject 5 with the master strobe 2 and the slave strobe 3.

Now, the photographing operation with multiple flashes executed in the embodiment is explained in reference to FIGS. 2A and 2B. FIG. 2A shows the quantity of light emitted at the master strobe 2 during the photographing operation with multiple flashes and FIG. 2B shows the quantity of light emitted at the slave strobe 3 during the photographing operation with multiple flashes. At a time point t1, the master strobe 2 issues a command for the slave strobe 3 to execute a preliminary light emission (also referred to as a pre-light emission) prior to a main light emission. This preliminary light emission command is generated by coding the quantity of light to be emitted at the slave strobe 3 in the main light emission as a light pulse train (string) signal.

The slave strobe 3, having received at its photodiode 4a or 4b the light pulse train constituting the preliminary light emission command issued from the master strobe 2, executes the preliminary light emission at a time point t2. It is to be noted that a preset quantity of light is emitted through the preliminary light emission.

Light reflected from the subject 5 illuminated with the light emitted through the preliminary light emission at the slave strobe 3 is received at a photometering photodiode (not shown), to be detailed later, of the digital camera 1, and if the photometered value is equal to or greater than a predetermined threshold value, the preliminary light emission command issued from the master strobe 2 on the camera side is judged to have been received at the slave strobe 3 in a normal manner, i.e., that the optical communication between the camera-side master strobe 2 and the separately provided slave strobe 3 is conducted in a normal manner.

It is to be noted that if the photometered value of the light reflected from the subject through the preliminary light emission is smaller than the threshold value, it is judged that a problem has occurred in the optical communication between the master strobe 2 and the slave strobe 3 due to an obstacle present between them.

The digital still camera 1 also makes a decision based upon the photometered value of the light reflected from the subject through the preliminary light emission at the slave strobe 3 as to whether or not the quantity of light to be emitted in the main light emission at the slave strobe 3 as specified in the preliminary light emission command is adequate. A table containing correct light emission quantities to be achieved in the main light emission set in correspondence to varying photometered values detected through the preliminary light emission is stored in memory in the digital still camera 1, and the correct light emission quantity to be achieved in the main light emission is determined through an arithmetic operation in correspondence to the photometered value of the light reflected from the subject at the time of the preliminary light emission by referencing the table.

If the quantity of light to be emitted through the main light emission at the slave strobe 3 as specified in the preliminary light emission command is judged to be smaller than the correct light emission quantity, the digital still camera 1 adjusts and changes the light emission quantity so as to achieve, at least, the correct light emission quantity. Then, at a time point t3, which precedes the main light emission, the camera-side master strobe 2 outputs a light pulse train generated by coding the adjusted value for the main light emission quantity. It is to be noted that if the quantity of light to be emitted in the main light emission is judged to be equal to or greater than the correct light emission quantity, the main light emission quantity is not adjusted.

The main light emission quantity adjust command from the camera-side master strobe 2 is received at the photodiode 4a or 4b of the slave strobe 3 which then adjusts the quantity of light to be emitted in the main light emission accordingly. When a predetermined length of time T1 elapses following the preliminary light emission, the slave strobe 3 executes the main light emission at a time point t4 to emit the quantity of light specified in the preliminary light emission command or the quantity of light adjusted in response to the main light emission quantity adjust command.

It is to be noted that while the master strobe 2 at the digital still camera 1 is exclusively used to achieve optical communication with the slave strobe 3 and does not execute a main light emission in the embodiment, the master strobe 2, too, may execute a main light emission as indicated with the dotted line in FIG. 2A. If the main light emission is executed both at the master strobe 2 and at the slave strobe 3, the quantities of light to be emitted at the two strobes should be set so that the sum of the quantities of light to be emitted at the strobes is equal to or greater than the correct light emission quantity.

By using the master strobe 2 exclusively to achieve optical communication with the slave strobe 3 in this manner, the need to equip the digital still camera 1 with an internal strobe with a large guide number is eliminated and thus, the digital still camera 1 can be provided as a compact unit.

If, on the other hand, the main light emission is executed both at the master strobe 2 and at the slave strobe 3, the main light emission at the master strobe 2 should be detected with the photodiode 4a or 4b of the slave strobe 3 to implement control so as to synchronize the start and the end of the main light emission at the slave strobe 3 with the start and the end of the main light emission at the master strobe 2.

Figure 3:
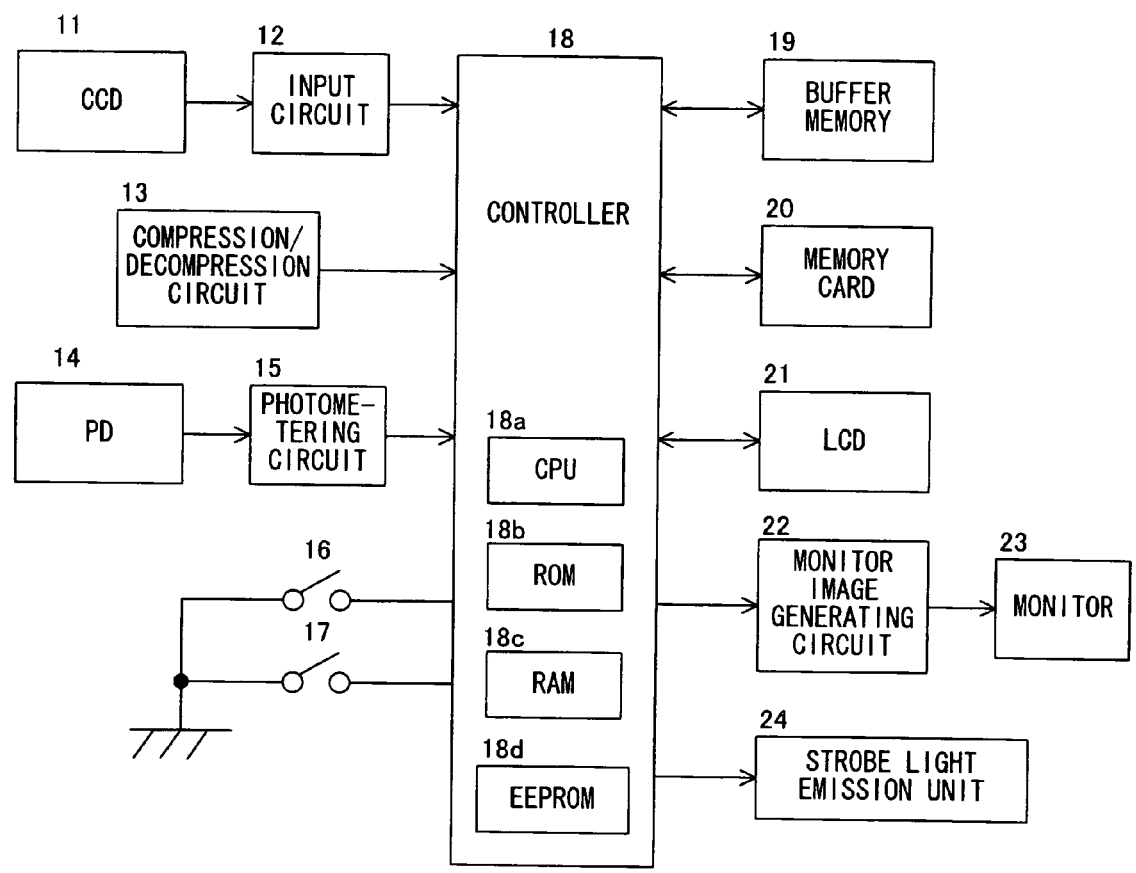
FIG. 3 shows the structure adopted in the digital still camera in the embodiment.

FIG. 3 shows the structure of the digital still camera 1 achieved in the embodiment. A CCD 11, which is an image capturing element that captures a subject image formed through a photographic lens (not shown), outputs analog signals indicating the brightness of the subject image, each in correspondence to a pixel. Namely, the subject is photographed with the CCD 11. An input circuit 12 executes processing such as gain adjustment on the analog signals output from the CCD 11, executes A/D conversion on the signals, executes image processing such as white balance adjustment, edge compensation and gamma correction on signals having undergone the A/D conversion and then output the results of the image processing as original image data. A compression/decompression circuit 13 compresses the original image data at a predetermined compression rate through JPEG or the like and also decompresses compressed image data to obtain the original image data.

A photodiode 14 and a photometering circuit 15 photometer the photographic field and output the photometered value. The photodiode 14 and the photometering circuit 15 also photometer light reflected from the subject 5 when the slave strobe 3 executes a preliminary light emission. A switch 16 is a power switch of the digital still camera 1, and a switch 17 is a shutter release switch.

A controller 18 which includes a CPU 18a, a ROM 18b, a RAM 18c, an EEPROM 18d and the like executes various types of arithmetic operations such as a focal point detection calculation, a photometric calculation and an exposure calculation and also implements camera sequence control, control on the optical communication between the master strobe 2 and the slave strobe 3 and the like. The table containing the correct light emission quantities for the main light emission set in correspondence to varying photometering values detected at the time of the preliminary light emission is stored in the EEPROM 18d.

A buffer memory 19 is a memory used to temporarily store the original image data obtained through a photographing operation and compressed image data obtained through the compression processing, and may be constituted with an SRAM, a VRAM, an SDRAM or the like. A memory card 20, which is a detachable recording medium, may be a flash memory. At an LCD 21, photographing information such as the exposure value and the number of frames is displayed.

At a monitor 23, display imaged data generated at a monitor image generating circuit 22 based upon original image data photographed with the CCD 11 are displayed and in addition, in a reproduction mode, compressed image data read out from the memory card 20 are decompressed at the compression/decompression circuit 13 and display image data generated at the monitor image generating circuit 22 based upon the decompressed image data are displayed at the monitor 23. A strobe light emission unit 24 is an electronic flash unit of the master strobe 2 explained earlier.

Figure 4:
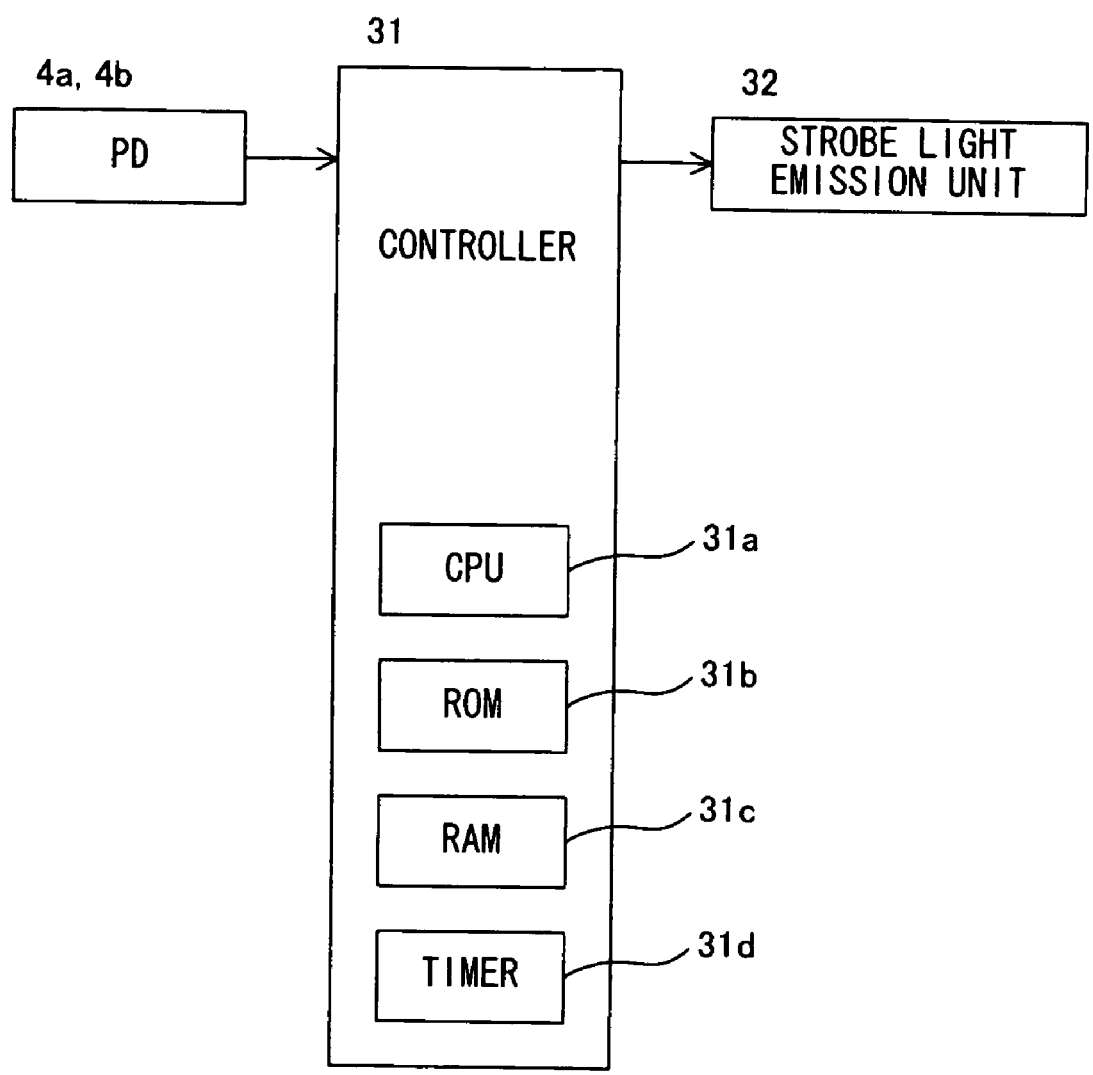
FIG. 4 shows the structure adopted in the slave strobe in the embodiment.

FIG. 4 shows the structure of the slave strobe 3. A light pulse train signal from the master strobe 2 is received at the photodiode 4a or 4b. It is to be noted that the two photodiode 4a or 4b are disposed one at a side surface and the other at a rear surface of the slave strobe 3, as shown in FIG. 1, to ensure that the light pulse train signal from the master strobe 2 is detected regardless of the specific positional relationship assumed by the master strobe 2, the slave strobe 3 and the subject 5 in a given situation, to affect the direction from which the light pulse train signal arrives. A controller 31, which includes a CPU 31a, a ROM 31b, a RAM 31c, a timer 31d and the like, implements control on the light emission at a strobe light emission unit 32.

Figure 5A:
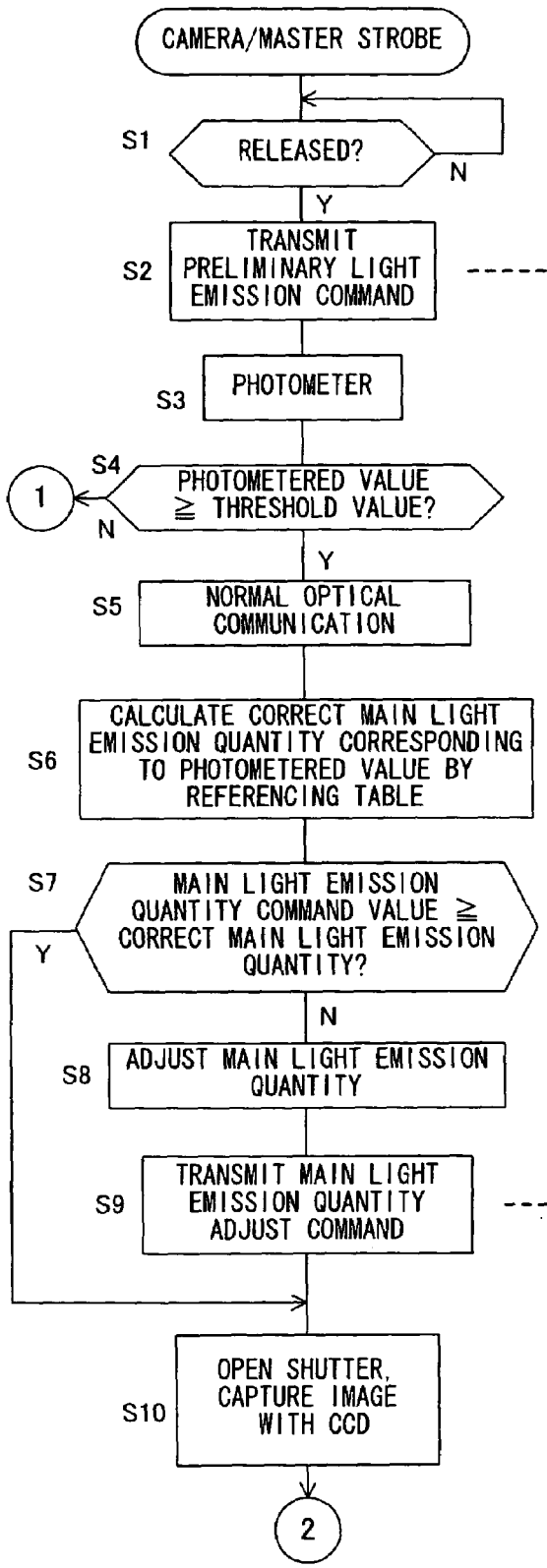
FIGS. 5A and 5B present flowcharts of the operation executed in the embodiment.
Figure 5B:
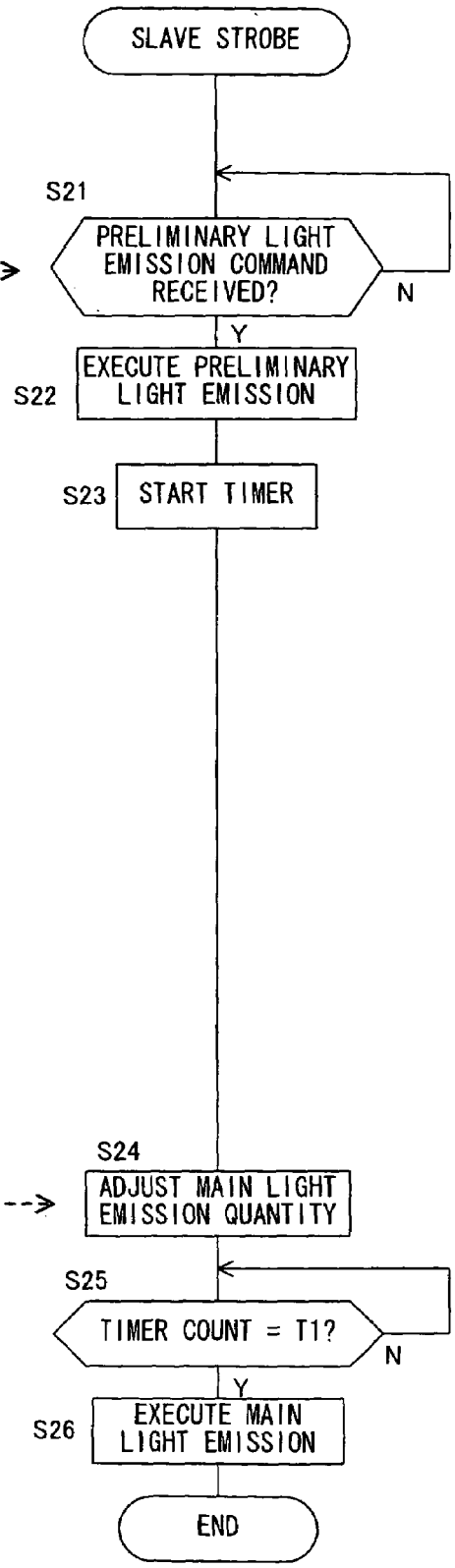
Figure 6:
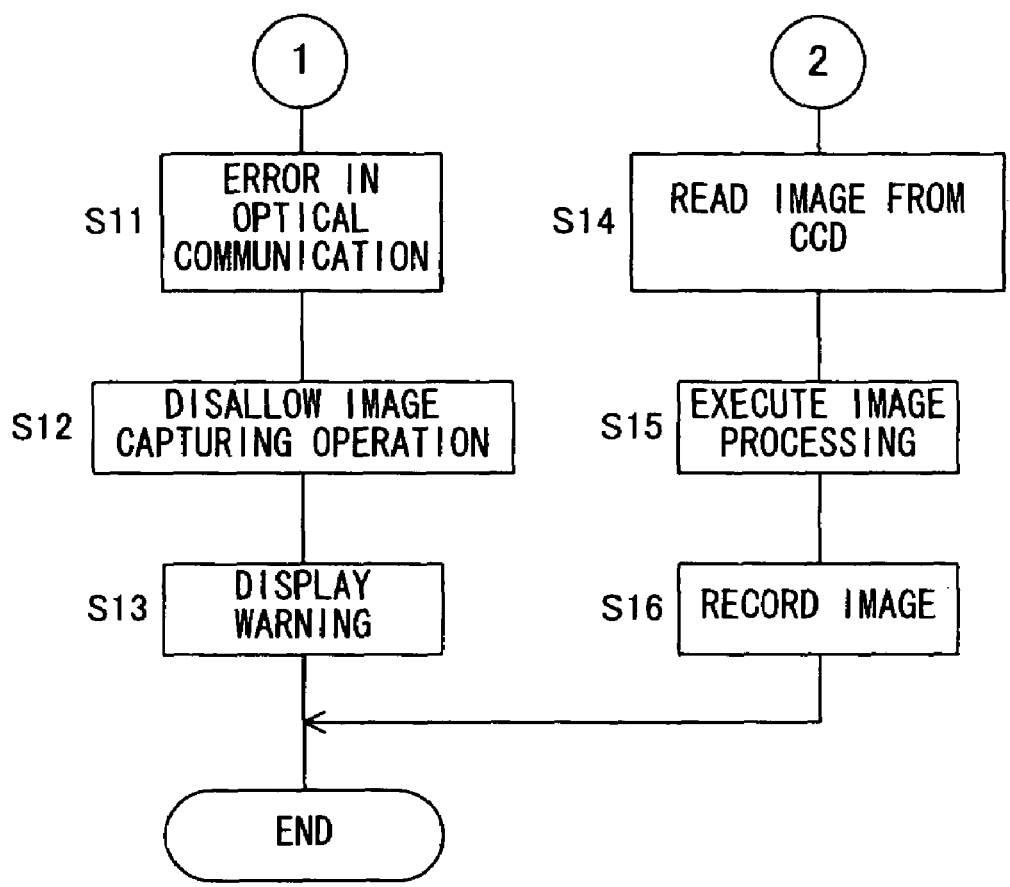
FIG. 6 presents a flowchart of the operation executed in the embodiment, in continuation from FIG. 5A.

FIG. 5A and FIG. 6 present a flowchart of the operation executed at the digital still camera 1 and the master strobe 2. FIG. 5B presents a flowchart of the operation executed at the slave strobe 3. In reference to these flowcharts, the operation achieved in the embodiment is explained. As the shutter release switch 17 at the camera 1 is turned on in step 1, the controller 18 in the camera 1 starts the operation shown in FIGS. 5A and 6.

In step 2, a preliminary light emission command is transmitted to the slave strobe 3. As explained earlier, this preliminary light emission command is generated by coding the quantity of light to be emitted in the main light emission at the slave strobe 3 as a light pulse train signal.

In step 21, the controller 31 at the slave strobe 3 receives the light pulse train signal constituting the preliminary light emission command from the master strobe 2 at the photodiode 4a or 4b and compares the level of the signal received at the photodiode 4a or 4b with a predetermined threshold value. If the level of the received signal is equal to or higher than the threshold value, the controller 31 judges that a preliminary light emission command has been received from the master strobe 2, decodes the light pulse train signal constituting the preliminary light emission command, thereby ascertaining the light emission quantity command value for the main light emission and stores the light emission quantity command value thus ascertained into the RAM 31c. Next, the operation proceeds to step 22 to execute the preliminary light emission at the strobe light emission unit 32 to achieve a predetermined light emission quantity. Then, a time count is started at the timer 31d.

In step 3, the controller 18 at the digital still camera 1 photometers light reflected from the subject 5 illuminated with the light emitted through the preliminary light emission at the slave strobe 3, which is received at the photodiode 14. In the following step 4, a decision is made as to whether or not the photometered value is equal to or greater than a predetermined threshold value. The operation proceeds to step 5 if the photometered value obtained through the preliminary light emission is determined to be equal to or greater than the threshold value, and in this case, it is judged that the slave strobe 3 has executed a preliminary light emission in response to the preliminary light emission command, indicating that the optical communication with the slave strobe 3 was achieved in a normal manner.

If the optical communication between the master strobe 2 and the slave strobe 3 was executed in a normal manner, the correct light emission quantity to be achieved in the main light emission is calculated in step 6, in correspondence to the photometered value of the reflected light from the subject 5 detected at the time of the preliminary light emission by referencing the table stored in the EEPROM 18d, which contains the correct main light emission quantities set in correspondence to varying photometered values detected at the time of preliminary light emission.

In step 7, a decision is made as to whether or not the main light emission quantity command value indicated in the preliminary light emission command (transmitted in step 2) is equal to or greater than the correct main light emission quantity, and if the main light emission quantity command value is determined to be equal to or greater than the correct main light emission quantity, the operation proceeds to step 10, whereas if the main light emission quantity command value is determined to be less than the correct main light emission quantity, the operation proceeds to step 8. If the main light emission quantity command value is smaller than the correct main light emission quantity, the main light emission quantity command value is adjusted to a value equal to or greater than the correct main light emission quantity in step 8, and a coded light pulse train signal indicating the adjusted main light emission quantity command value is transmitted to the slave strobe 3 in the following step 9.

It is to be noted that if the correct light emission quantity for the main light emission cannot be achieved even by setting the light emission quantity at the slave strobe 3 to the highest level, the gain to be applied to the image signals read out from the CCD 11 is raised at the input circuit 12. With this, the photographing preparation is completed and accordingly, the operation proceeds to step 10 to release the shutter (not shown) thereby starting an image capturing operation at the CCD 11.

The controller 31 at the slave strobe 3 receives the main light emission quantity adjust command from the master strobe 2 and adjusts the main light emission quantity command value stored in the RAM 31c accordingly in step 24. In the following step 25, it checks the time count at the timer 31d to determine whether or not the predetermined length of time T1 has been counted at the timer 31d, and the operation proceeds to step 26 if the predetermined length of time T1 has elapsed following the preliminary light emission start to execute the main light emission at the strobe light emission unit 32 so as to emit light in conformance to the main light emission quantity command value stored in the RAM 31c.

In step 14 in FIG. 6 following the image capturing operation, the controller 18 at the digital still camera 1 reads out the image from the CCD 11, and it executes the image processing at the input circuit 12 and the compression/decompression circuit 13 in the following step 15. Then, the image is recorded into the memory card 20 in step 16.

If, on the other hand, it is decided in step 4 that the photometered value detected at the time of the preliminary light emission is smaller than the threshold value, the operation proceeds to step 11 in FIG. 6 to determine that an error has occurred in the optical communication between the master strobe 2 and the slave strobe 3 and a preliminary light emission has not been executed at the slave strobe 3 as a result. In this case, an image capturing operation at the CCD 11 is disallowed in step 12, and a warning is displayed at the LCD 21 and also an alarm is sounded through a buzzer (not shown) in the following step 13. If the distance to the subject is too large, too, the photometered value will be smaller than the threshold value. Under such circumstances, too, an image capturing operation at the CCD 11 is disallowed, a warning is displayed at the LCD 21 and an alarm is sounded through the buzzer (not shown).

It is to be noted that if a successful optical communication was not achieved between the master strobe 2 and the slave strobe 3 and a preliminary light emission has not been executed at the slave strobe 3 as a result, the gain to be applied to the image signals may be raised at the input circuit 12, an image capturing operation may be forcibly executed and an image obtained through the image processing may be recorded instead of disallowing an image capturing operation.

As described above, light is emitted from the strobe light emission unit 24 at the master strobe 2 to transmit a light signal constituting a preliminary light emission command to the separately provided slave strobe 3, the strobe light emission unit 32 at the separate slave strobe 3 executes a preliminary light emission upon receiving the light signal constituting the preliminary light emission command at the photodiode 4a or 4b, the photodiode 14 and the photometering circuit 15 at the digital still camera 1 photometer the photographic field as the separately provided slave strobe 3 executes the preliminary light emission and if the photometered value is equal to or greater than the predetermined threshold value, the optical communication between the digital still camera 1 and the separately provided slave strobe 3 is judged to be enabled and an image capturing operation is permitted in the embodiment. As a result, when executing a photographing operation with multiple flashes, any error in the optical communication between the camera-side master strobe and the separately provided slave strobe can be detected with a high degree of reliability and the execution of the photographing operation with multiple flashes is prevented if there is no flash light output or the quantity of flash light output is not adequate.

In addition, the preliminary light emission command is provided as a coded light pulse train signal indicating the light emission quantity command value for the main light emission executed at the separately provided slave strobe 3 in the embodiment, and thus, the preliminary light emission command and the main light emission quantity command value for the separately provided slave strobe 3 can be transmitted in an efficient manner through a single optical communication.

Furthermore, a table containing the correct light emission quantities for the main light emission set in correspondence to varying photometered values detected at the time of the preliminary light emission is stored in memory, the correct light emission quantity for the main light emission is read out from the table in correspondence to the specific photometered value detected through the preliminary light emission, the light emission quantity command value is adjusted to a value equal to or greater than the correct light emission quantity if the light emission quantity command value is smaller than the correct light emission quantity, and a coded light pulse train signal indicating the adjusted light emission quantity command value is transmitted from the strobe light emission unit 24 at the digital still camera 1 to the separately provided slave strobe 3 in the embodiment. By using this camera system, a photographing operation with multiple flashes can be executed to photograph the subject illuminated properly.

In the embodiment, if the maximum light emission quantity at the separately provided slave strobe 3 is less than the correct light emission quantity, the controller 18 raises the gain to be applied to the image capturing signals output from the CCD 11 in correspondence to the photometered value detected at the time of the preliminary light emission. As a result, even when the strobe does not provide an adequate level of light output, a photographing operation with multiple flashes can be executed and the user does not need to miss a good photo opportunity.

In the embodiment, the strobe light emission unit 24 at the digital still camera 1 is not engaged in the main light emission and only the strobe light emission unit 32 at the separately provided slave strobe 3 is used for the main light emission. This eliminates the need to equip the digital still camera with an internal strobe with a large guide number and thus, the digital still camera can be provided as a compact unit.

The slave strobe 3 may constitute an electronic flash unit, the strobe light emission unit 24 may constitute a flash light emission unit, the photodiode 14 and the photometering circuit 15 together may constitute a photometering unit, the controller 18 may constitute a light emission control unit and a gain adjustment unit, the strobe light emission unit 32 may constitute a flash light emission unit, the photodiode 4a or 4b may constitute a light receiving unit, the controller 31 may constitute a light emission control unit, and the EEPROM 18 may constitute a storage unit. It is to be noted that as long as the functions characterizing the present invention are not compromised, the individual components may assume structures other than those explained above.

It is to be noted that while an explanation is given above in reference to the embodiment on a camera system that executes a photographing operation with multiple flashes by utilizing a master strobe and a single slave strobe, the present invention may also be adopted in a camera system that executes a photographing operation with multiple flashes by utilizing a master strobe and two or more slave strobes.

In addition, while the digital still camera 1 includes an internal master strobe 2 in the embodiment described above, an external master strobe may be mounted via the accessory shoe of the digital still camera or a separate master strobe may be connected to the digital still camera with a cable, instead.

Furthermore, while an explanation is given above in reference to the embodiment on an example in which the present invention is adopted in a digital still camera, the present invention may be also adopted in a camera that uses silver halide film to achieve advantages similar to those explained earlier. When adopted in a silver halide camera, exposure onto the silver halide film by opening/closing the shutter is allowed instead of allowing an image capturing operation at the CCD 11.

The above described embodiment is an example, and various modifications can be made without departing from the spirit and scope of invention.

What is claimed is:

1. A camera system comprising:
   a camera having a photometering unit and a first light emission control unit;
   a first electronic flash unit having a first flash light emission unit, a light emission from which is controlled by the first light emission control unit, either built into or externally mounted at the camera; and
   a second electronic flash unit having a second flash light emission unit, a light receiving unit and a second light emission control unit, provided separately from the camera, wherein:
   the first light emission control unit transmits a light signal constituting a preliminary light emission command to the second electronic flash unit by causing the first flash light emission unit to emit light;
   the second light emission control unit engages the second flash light emission unit in a preliminary light emission upon receiving the light signal constituting the preliminary light emission command at the light receiving unit; and
   the first light emission control unit engages the photometering unit to photometer a subject when the second electronic flash unit executes the preliminary light emission, and if a photometered value thus obtained is equal to or greater than a predetermined threshold value, the first light emission control unit judges that optical communication between the camera and the second electronic flash unit is enabled and allows a photographing operation to be executed.

2. A camera system according to claim 1, wherein:
   if the photometered value detected when the preliminary light emission is executed is less than the predetermined threshold value, the first light emission control unit judges that the optical communication between the camera and the second electronic flash unit is disabled, disallows a photographing operation and issues a warning.

3. A camera system according to claim 1, wherein:
   the preliminary light emission command contains a coded light pulse train signal indicating a light emission quantity command value for a main light emission to be executed at the second electronic flash unit.

4. A camera system according to claim 3, wherein:
   the camera includes a storage unit in which a table containing correct light emission quantities for the main light emission set in correspondence to varying photometered values detected when the preliminary light emission is executed is stored; and
   the first light emission control unit reads out a correct light emission quantity for the main light emission corresponding to the photometered value detected through the preliminary light emission from the table, adjusts the light emission quantity command value to a value equal to or greater than the correct light emission quantity if the light emission quantity command value is less than the correct light emission quantity, and transmits a coded light pulse train indicating the adjusted light emission quantity command value to the second electronic flash unit from the first flash light emission unit.

5. A camera system according to claim 4, wherein:
the camera includes;
a CCD that captures an image of a subject; and
a gain adjustment unit that raises a gain to be applied to an image capturing signal output from the CCD in correspondence to the photometered value obtained through the preliminary light emission if a maximum light emission quantity that can be achieved at the second electronic flash unit is less than the correct light emission quantity.

6. A camera system according to claim 1, wherein:
the first flash light emission unit at the camera is not engaged in the main light emission and the main light emission is executed at the second flash light emission unit of the second electronic flash unit alone.

7. A camera that executes a photographing operation with multiple flashes, comprising:
a photometering unit; and
a control unit, wherein:
the control unit controls light emission at a first electronic flash unit which is either built into or externally mounted at the camera and transmits a light signal constituting a preliminary light emission command to a second electronic flash unit provided separately from the camera by engaging the first electronic flash unit in light emission;
the photometering unit photometers a subject when the second electronic flash unit executes a preliminary light emission; and
the control unit allows a photographing operation to be executed if a photometered value detected at the photometering unit is equal to or greater than a predetermined threshold value.

8. A camera according to claim 7, wherein:
if the photometered value obtained through the preliminary light emission is smaller than the predetermined threshold value, the control unit disallows a photographing operation and issues a warning.

9. A camera according to claim 7, wherein:
the preliminary light emission command contains a coded light pulse train signal indicating a light emission quantity command value for a main light emission to be executed at the second electronic flash unit.

10. A camera according to claim 9, further comprising:
a storage unit in which a table containing correct light emission quantities for the main light emission set in correspondence to varying photometered values detected when the preliminary light emission is executed is stored, wherein:
the control unit reads out a correct light emission quantity for the main light emission corresponding to the photometered value detected through the preliminary light emission from the table, adjusts the light emission quantity command value to a value equal to or greater than the correct light emission quantity if the light emission quantity command value is less than the correct light emission quantity and transmits a coded light pulse train indicating the adjustedlight emission quantity command value to the second electronic flash unit from the first electronic flash unit.

11. A camera according to claim 10, further comprising:
a CCD that captures an image of the subject; and
a gain adjustment unit that raises a gain to be applied to an image capturing signal output from the CCD in correspondence to the photometered value obtained through the preliminary light emission if a maximum light emission quantity that can be achieved at the second electronic flash unit is less than the correct light emission quantity.

12. A camera according to claim 7, wherein:
the first electronic flash unit is not engaged in the main light emission and the main light emission is executed at the second electronic flash unit alone.

13. A camera according to claim 7, wherein the camera is a digital still camera.

14. A camera system according to claim 1, wherein:
the camera includes an image capturing device that captures an image of a subject; and
the photographing operation is an image capturing operation executed at the image capturing device.

15. A camera according to claim 7, further comprising:
an image capturing device that captures an image of a subject, wherein:
the photographing operation is an image capturing operation executed at the image capturing device.

* * * * *